Nov. 10, 1931. J. Q. HOLMES 1,831,115
APPARATUS FOR REMOVING INSULATION FROM WIRES
Filed Oct. 8, 1930 4 Sheets-Sheet 2
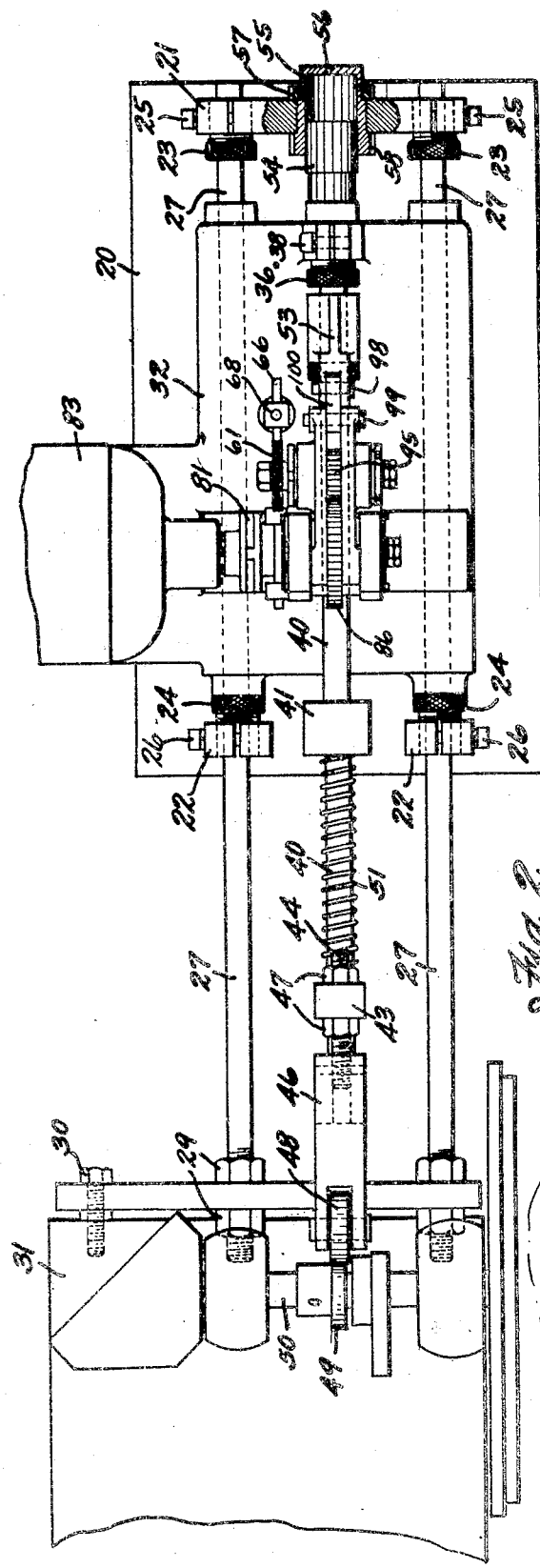
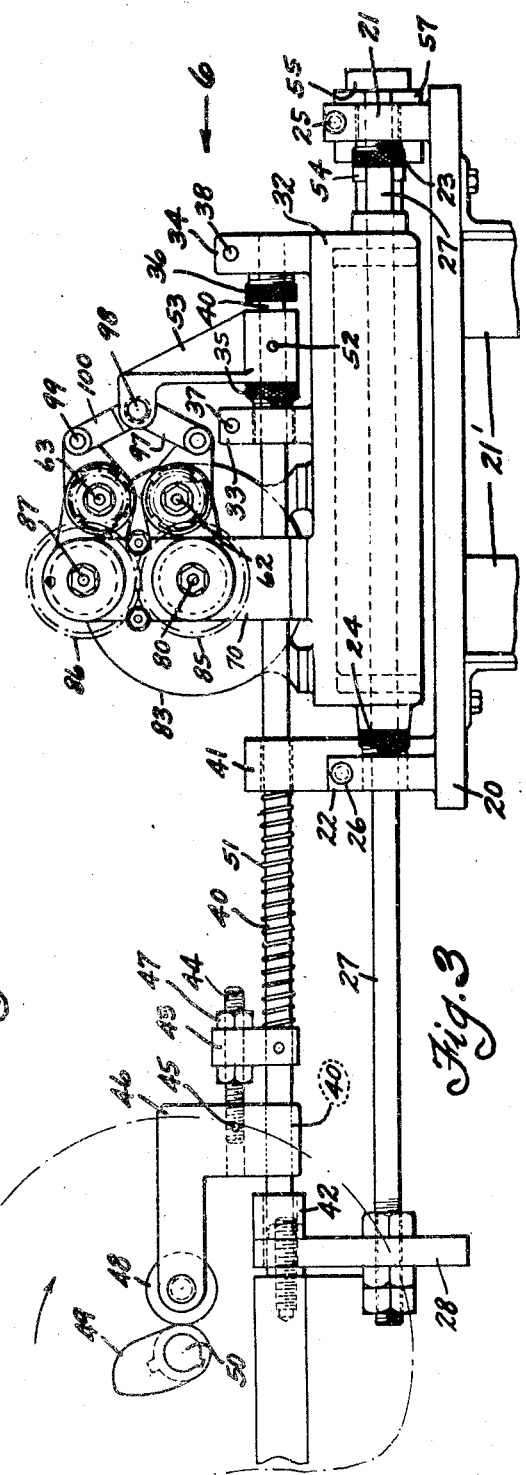
INVENTOR
John Q. Holmes
BY
his ATTORNEYS Nov. 10, 1931.   J. Q. HOLMES   1,831,115
APPARATUS FOR REMOVING INSULATION FROM WIRES
Filed Oct. 8, 1930   4 Sheets-Sheet 4

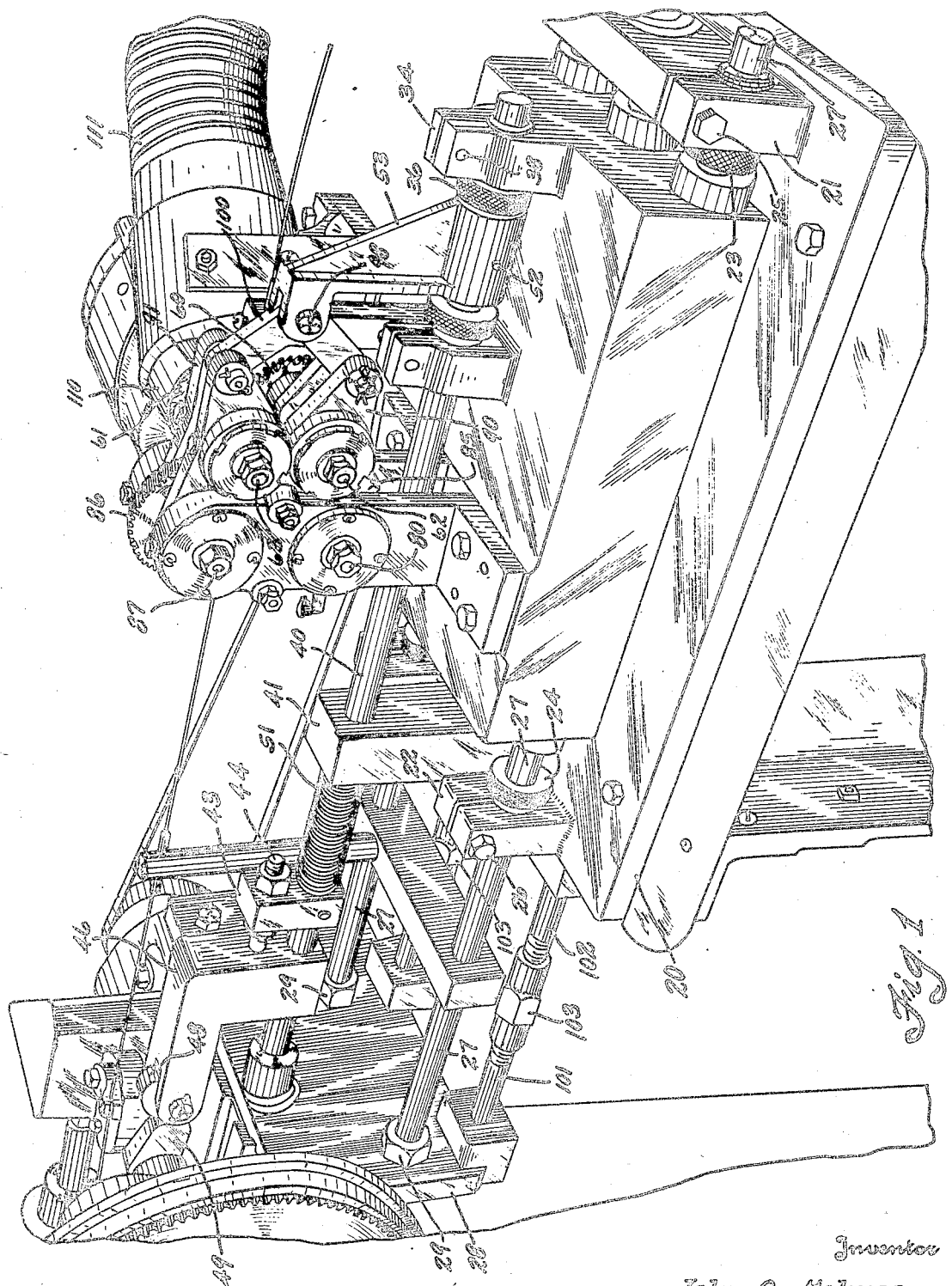

Inventor
John Q. Holmes
By Spencer Hardman and Fehr
his Attorneys

Patented Nov. 10, 1931

1,831,115

UNITED STATES PATENT OFFICE

JOHN Q. HOLMES, OF ANDERSON, INDIANA, ASSIGNOR TO DELCO-REMY CORPORATION, OF ANDERSON, INDIANA, A CORPORATION OF DELAWARE

APPARATUS FOR REMOVING INSULATION FROM WIRES

Application filed October 8, 1930. Serial No. 487,221.

This invention relates to an apparatus for stripping the insulation from portions of insulated wire used in the manufacture of coils for electrical instruments. More particularly the invention relates to improvements in an insulation stripping device capable of use in conjunction with a wire coil winding machine. One type of winding machine with which the present invention may be used is disclosed in my copending application Serial No. 440,974, filed April 2, 1930. This machine winds wire into coils and cuts off the formed coil from the portion of the wire remaining in the machine. Each coil has its end portion stripped of insulation to facilitate connecting the coil ends with terminals of electrical instruments. This copending application also discloses the cooperating relation with the winding machine and insulation stripping device which operates intermittently to strip the insulation from portions of the wire at regular spaced intervals. These intervals are so spaced that substantially all of the wire which remains covered with insulation was wound into a coil. The coil is severed from the wire remaining in the machine at the point about mid-way between the ends of the bared portion of the wire, thus each coil has two bared leads extending from windings of insulated covered wire.

It is more particularly an object of the present invention to simplify the construction and thereby reduce the cost of manufacture of a wire insulation stripping device of this type.

Further objects and advantages of the present invention will be apparent from the following description, reference being had to the accompanying drawings, wherein a preferred embodiment of one form of the present invention is clearly shown.

In the drawings:

Fig. 1 is a fragmentary perspective view of an insulation stripping device embodying the present invention shown in cooperative relation with the driving mechanism of a coil winding machine, a fragment only of which is shown.

Fig. 2 is a plan view of the insulation stripping device and driving mechanism shown in Fig. 1.

Fig. 3 is a side elevation.

Figure 5:
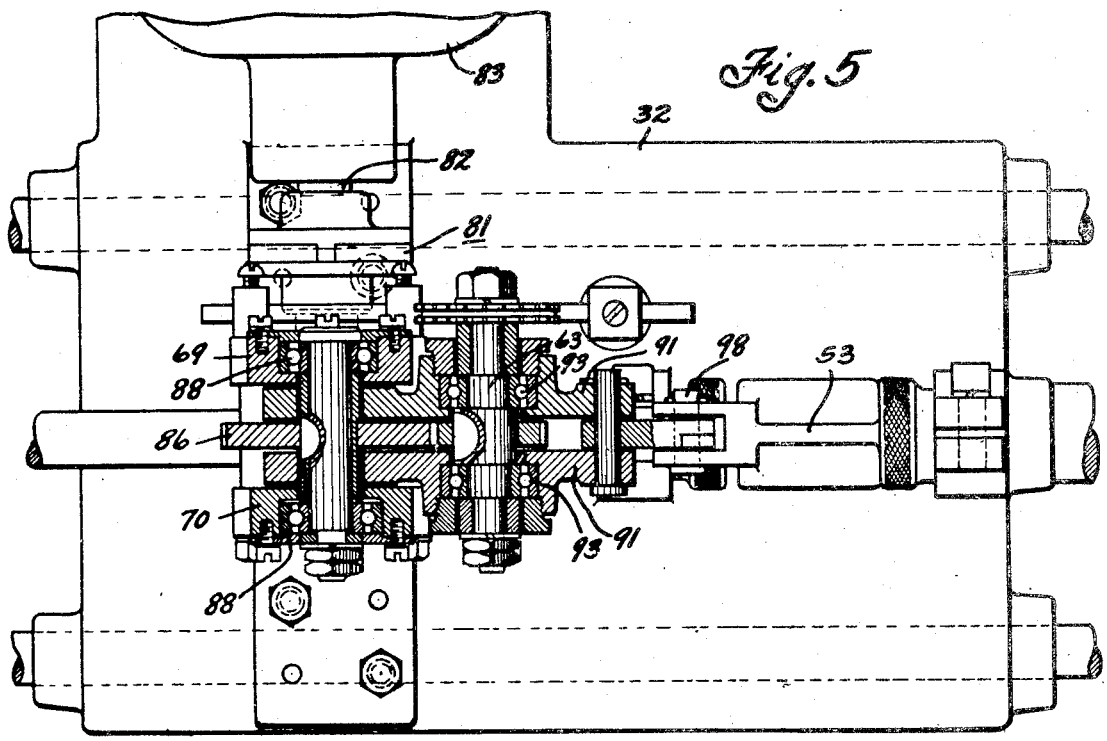
Fig. 5 is a sectional view on the line 5—5 of Fig. 4.
Figure 4:
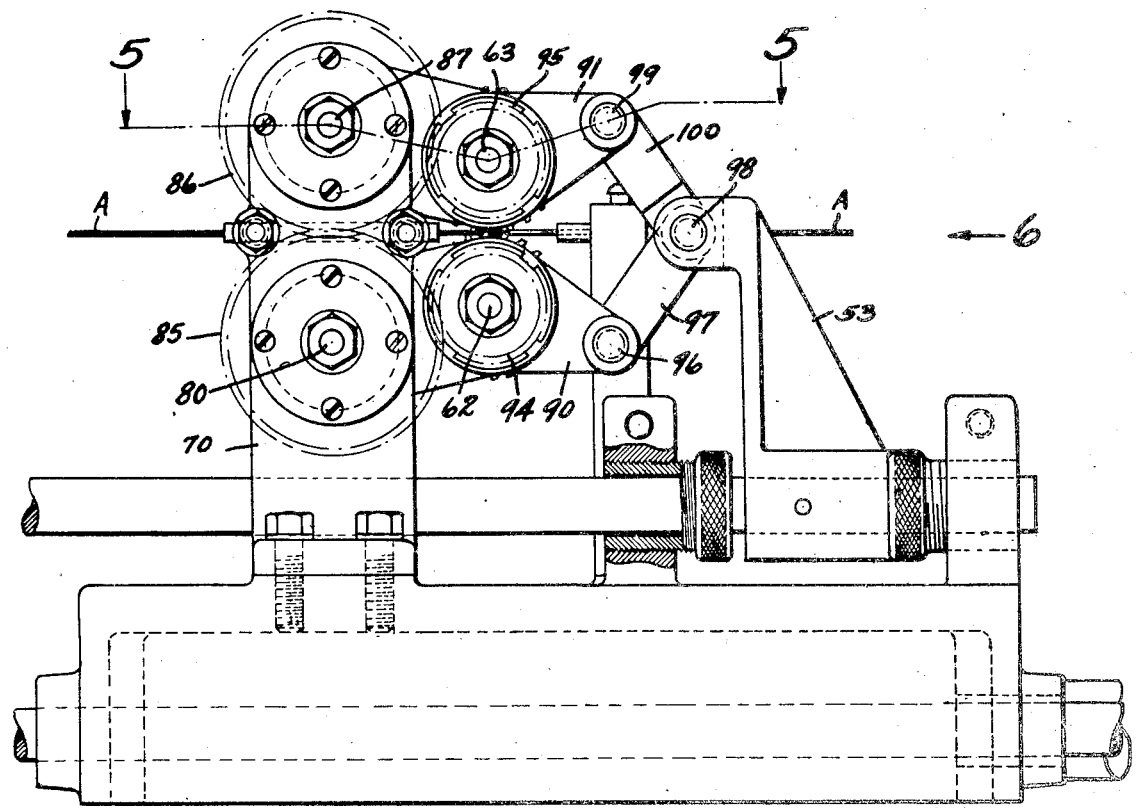
Fig. 4 is a fragmentary side elevation partly in section and drawn to a larger scale than Fig. 3.
Figure 6:
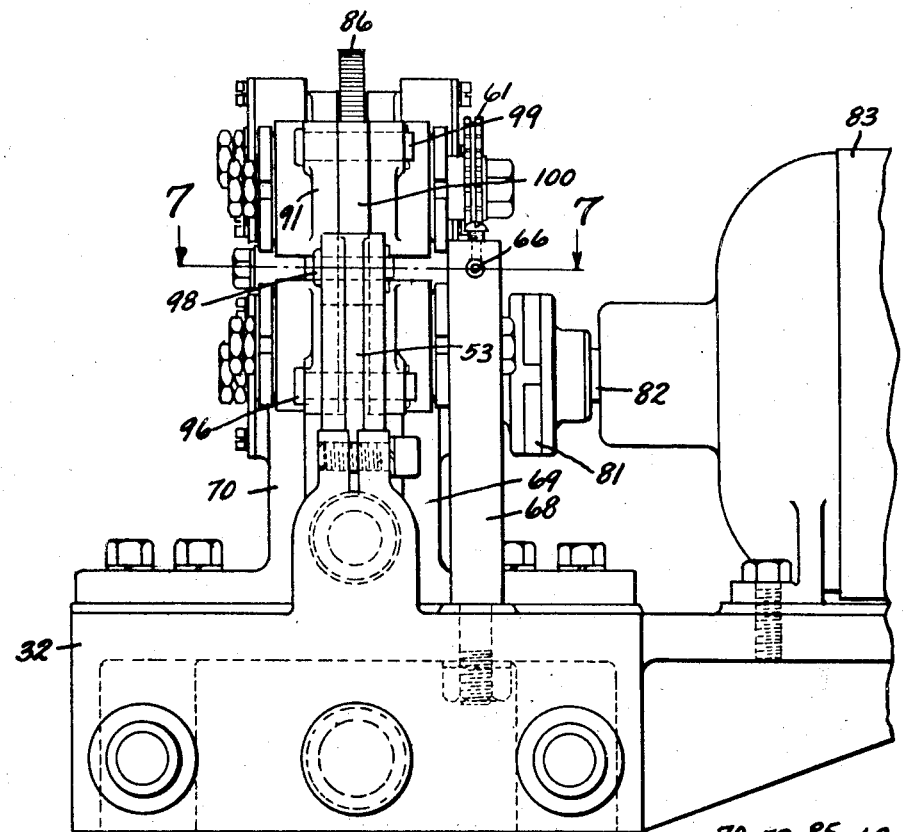
Fig. 6 is an end view as viewed in the direction of the arrow 6 in Figs. 3 and 4.

The insulation stripping device is supported by a table having a top 20 and legs 21'. The top 20 carries an integral bracket 31 at the right hand end of the table 20 and a pair of spaced brackets 22 at the left hand end. Brackets 21 and 22 threadedly receive bushings 23 and 24, respectively. The bushings 23 and 24 may be clamped in the desired position of adjustment with respect to brackets 21 and 22 respectively, by clamping screws 25 and 26 respectively, which when tightened cause the split portions of the bracket to be tightly clamped around the bushings.

The bushings 23 and 24 provide supports for guide rods 27 having their left hand end threaded and passing through a stationary bracket 28. Nuts 29 cooperate with the rods 27 to secure the rods to the bracket 28. The bracket 28 is attached by screws 30 to the table 31 of the coil winding machine with which the insulation stripper is associated. The rods 27 provide supporting guides for a horizontal slidable table 32 providing clamping brackets 33 and 34 receiving, respectively threaded bushings 35 and 36 which may be clamped in the desired position of adjustment with respect to the brackets 33 and 34 by clamping screws 37 and 38 which cooperate with split portions of these brackets. The bushings 35 and 36 receive an operating rod 40 which passes through a guide bracket 41 provided by the table 20 and through a guide bracket 42 provided by the bracket 28, the rod 40 carries a block 43 having a plain hole through which passes a threaded stud 44 attached by pin 45 to the block 46 through which the rod 40 passes. The stud 44 receives nuts 47 by which the block 46 may be secured in the desired spaced relation with respect to block 43. Block 46 carries a roller 48 which cooperates with a cam 49 driven by the main drive shaft 50 of the coil winding machine with which the insulation device is associated. A spring 51, surrounding the rod 40 and located between the bracket 41 and the block 43, urges the roller 48 against the cam 49. The cam 49 is normally rotated clockwise as viewed in Fig. 3 and hence operates to move the rod 40 toward the right for a purpose to be described. The spring 51 therefore operates to move the rod 40 toward the left.

The rod 40 is attached by a pin 52 to a bracket 53, the hub of which is of less length than the space between the bushings 35 and 36. Hence the rod 40 is connected with the table 32 by lost motion connection. That is, the bracket 53 may move a short distance toward the right before causing the table 32 to move. In order to make sure the table 32 does not start moving toward the right before the bracket 53 strikes the bushing 36, movement of the table 32 toward the right is resisted by a dash pot which comprises a piston 54 attached to the table 32 and cooperating with a cylinder 55 having a small vent 56 attached to the bracket 21. The cylinder 55 is secured to the bracket 21 by a nut 57 which threadedly engages the cylinder 55 and clamps the bracket 21 between it and a flange 58 of the cylinder. This dash pot operates to retard motion of the table 32 toward the left as well as toward the right. Therefore the lost motion between bracket 53 and the table 32 must be taken up in either direction before the table will move. This feature of the connection between the operating cam 49 and the table 32 is made use of in the operating mechanism for advancing and retracting a pair of rotary insulation cutters with respect to the wire whose insulation is to be stripped at uniformly spaced portions.

Figure 8:
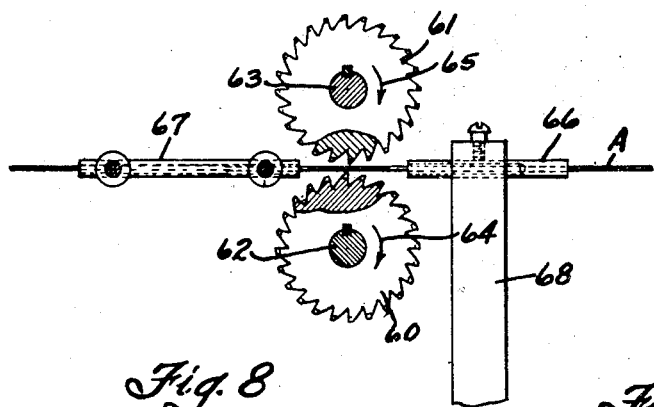
Fig. 8 is a sectional view on the line 8—8 of Fig. 7.
Figure 7:
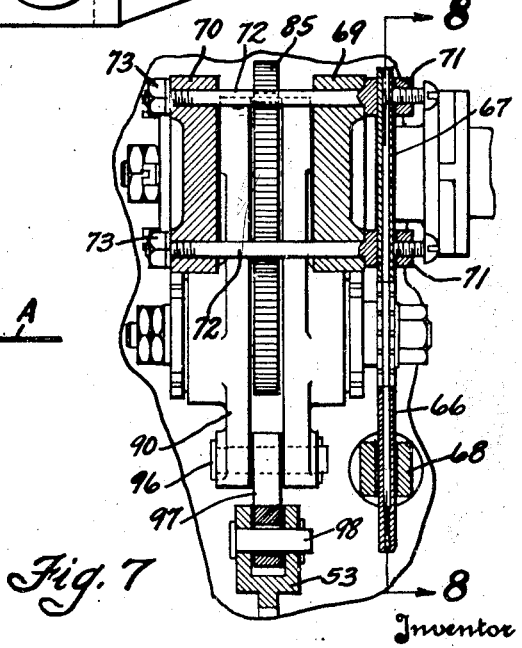
Fig. 7 is a sectional view on the line 7—7 of Fig. 6.

The insulation cutters 60 and 61, shown more clearly in Fig. 8, are attached to shafts 62 and 63 which rotate in opposite directions as indicated by arrows 64 and 65 respectively. The wire A to be stripped passes through guide tubes 66 and 67, supported respectively by a post 68 and a bracket 69, attached to the table 32 which also supports a bracket 70 similar to the bracket 69. As shown in Fig. 7, the tube 67 is not directly attached to the bracket 69 but passes through transverse holes in the heads 71 of bolts 72 which pass through brackets 69 and 70 and are fastened by nuts 73 threaded upon the left hand ends of the bolts 72 as viewed in Fig. 7.

The brackets 69 and 70 support a shaft 80 connected by a coupling 81 with the shaft 82 of an electrical motor 83 which is supported by table 32. Shaft 80 drives a gear 85 which in turn drives a gear 86 attached to a shaft 87 supported by the brackets 69 and 70 vertically above the shaft 80. The shafts 80 and 87 are journalled in suitable roller bearings. The bearings for the shaft 87 are shown at 88 in Fig. 5.

The shafts 80 and 87 respectively, support pivoted arms 90 and 91 respectively, which rotatively support the shafts 62 and 63 respectively. These shafts are journalled in suitable ball bearings, the bearings for the shaft 63 being shown at 93 in Fig. 5. The shafts 62 and 63 are attached respectively to gears 94 and 95 which mesh respectively with gears 85 and 86.

The pair of arms 90 is connected by a pin 96 with a link 97 attached by pin 98 to the bracket 53. The pair of arms 91 are connected by pin 99 to a link 100 also connected by pin 98 to bracket 53.

The wire stripping apparatus operates in the following manner: As stated before the cam 49 rotates in a clockwise direction as viewed in Fig. 3 to move the rod 40 from left toward right. On account of the resisting dash pot provided by piston 54 and cylinder 55, the table 32 does not start moving toward the right at the time the rod starts moving. Therefore, there is relative motion between the rod 40 and the table 32 during which the bracket is moved away from the bushing 35 into engagement with the bushing 36. During this relative motion period the bracket 53 moves the pivot pin 98 away from the shafts 80 and 87, thereby causing the pivoted arms 90 and 91 to approach each other and thereby causing the rotary cutters 60 and 61 to engage the wire. The cam 49 continues to move the rod 40 after the bracket 53 engages the bushing 36, hence the table 32 will move toward the right a certain distance while the cutters 60 and 61 strip the insulation from the wire A. Then as the high point of the cam 49 moves away from the roller 48 motion of the rod 40 from right to left begins under the operation of the spring 51. Since the dash pot resists movement of the table 32 also toward the left, motion of the table 32 in this direction will not begin until after the rod 40 has moved toward the left sufficiently to cause the bracket 53 to engage the bushing 35. During the movement of the bracket 53 toward the left relative to the table 32 the pivot pin 98 is moved toward the shafts 80 and 87 in order to separate the cutters 60 and 61 from the wire A. After the bracket 53 engages the bushing 35 the table 32 begins to move and this motion continues until the table engages the stop bushing 24. It is therefore apparent that the cutters 60 and 61 operate to strip the insulation from the wire only during the movement of the table 32 toward the right or away from the machine which winds the wire into a coil. This construction is desirable because the portion of the wire between the coil winding machine and the insulation stripping device can be maintained taut since the end of the wire in the coil winding machine can be fixed in position. It is desirable to have the cutters disengaged from the wire while the table 32 moves toward the coil winding machine because that portion of the wire between the insulation stripping device and the wire supply reel is not maintained taut but is in a relatively loose condition. Another reason for this feature is that it is not necessary for the cutters to engage the wire during the return movement of the table. Stripping of the insulation naturally dulls the cutters therefore it is desirable that the cutters remain out of engagement with the wire after the insulation has been stripped.

The bushings 35 and 36 may be adjusted with respect to their supported brackets 33 and 34 so that the space between the bushings can be varied in order to adapt the machine for stripping different sizes of wire. It is apparent that increasing the space between the bushings 35 and 36 will increase the lost motion between the rod 40 and the table 32 and thus increase the amount of movement of the arms 90 and 91 which carry the cutters.

The table 20 is maintained in a certain fixed spaced relation with respect to the winding machine by pairs of rods 101 and 102 attached together by turnbuckles 103 and attached respectively to bracket 28 and the table 20. By turning these turnbuckles 103 the relation between the insulation stripper and the coil winding machine can be varied in order to adapt the stripping device to the machine so that the bared portion of the wire will be located intermediate those portions of which are wound into a coil. Adjustment of the nuts 47 controlling the relation between the cam roller 48 and the rod 40 and the adjustment of the bushings 24 can be made for the purpose of varying the length of that portion of the wire which is stripped of insulation.

As shown in Fig. 1, the cutters 60 and 61 are enclosed by a housing 110 connected with a suction pipe 111 which will conduct away by suction particles of insulation cut from the wire.

While the form of embodiment of the present invention as herein disclosed, constitutes a preferred form, it is to be understood that other forms might be adopted, all coming within the scope of the claims which follow.

What is claimed is as follows:

1. Apparatus for stripping insulation from portions of insulated wire, comprising in combination, a reciprocatable table, a pair of rotary cutters mounted on said table, a wire guide mounted on said table, movable members for supporting the cutters for bodily movement toward and from the wire, and means for moving the table and said cutter supporting members and including a reciprocating member having a lost motion connection with the table and a mechanism operated by said reciprocating member while the lost motion is being taken up for moving the cutter supporting members.

2. Apparatus according to claim 1 further characterized as having means for yieldingly resisting movement of the table.

3. Apparatus for stripping insulation from portions of insulated wire, comprising in combination, a reciprocatable table, a pair of rotary cutters mounted on said table, a wire guide mounted on said table, movable members for supporting the cutters for bodily movement toward and from the wire, and means for moving the table and said cutter supporting members and including a reciprocating rod, a bracket carried by the rod and movable by the rod between stops on the table which stops are spaced apart a distance greater than the width of the bracket whereby a lost motion connection between the rod and table is provided, and a mechanism operated by the bracket for moving the cutter supporting members.

4. Apparatus according to claim 3 further characterized as having a dash pot means for resisting movement of the table.

5. Apparatus for stripping insulation from portions of insulated wire, comprising in combination, a reciprocatable table, a pair of rotary cutters mounted on said table, a wire guide mounted on said table, a pair of pivoted arms supporting the cutters for bodily movement, a reciprocating rod, a bracket carried by the rod and movable by the rod between stops on the table which stops are spaced apart a distance greater than the width of the bracket whereby a lost motion connection between the rod and table is provided, and a pair of toggle links connected with the bracket and connected respectively with the pivoted arms.

6. Apparatus according to claim 5 further characterized as having a piston attached to the table and cooperating with a stationary, vented dash pot cylinder.

7. Apparatus for stripping insulation from portions of insulated wire, comprising in combination, a reciprocatable table, a motor supported by the table, a pair of parallel shafts supported by the table, gears drivingly connecting the shafts, means connecting the motor with one of the shafts, arms respectively pivoted upon said shafts, other shafts respectively carried by the arms, gears on said other shafts drivingly connecting the other shafts with the first mentioned shafts, rotary cutters carried respectively by said other shafts, toggle links pivotally attached respectively to said arms, a bracket to which the links are pivoted together, a rod for moving the bracket in the direction of movement of the table, a lost motion connection between the bracket and table, and means for yieldingly resisting movement of the table.

In testimony whereof I hereto affix my signature.

JOHN Q. HOLMES.